(12) United States Patent
Dickhoff

(10) Patent No.: US 10,428,846 B2
(45) Date of Patent: Oct. 1, 2019

(54) FLUID CONTROL DEVICE AND METHOD FOR OPERATING A FLUID CONTROL DEVICE

(71) Applicant: FESTO AG & Co. KG, Esslingen (DE)

(72) Inventor: Andreas Dickhoff, Kirchheim Unter Teck (DE)

(73) Assignee: FESTO AG & CO. KG, Esslingen (DE)

( * ) Notice: Subject to any disclaimer, the term of this patent is extended or adjusted under 35 U.S.C. 154(b) by 0 days.

(21) Appl. No.: 15/768,303

(22) PCT Filed: Oct. 29, 2015

(86) PCT No.: PCT/EP2015/075081
§ 371 (c)(1),
(2) Date: Apr. 13, 2018

(87) PCT Pub. No.: WO2017/071753
PCT Pub. Date: May 4, 2017

(65) Prior Publication Data
US 2018/0298923 A1    Oct. 18, 2018

(51) Int. Cl.
*F15B 13/043*    (2006.01)
*F15B 19/00*    (2006.01)
(Continued)

(52) U.S. Cl.
CPC ...... *F15B 13/0433* (2013.01); *F15B 13/0438* (2013.01); *F15B 19/002* (2013.01);
(Continued)

(58) Field of Classification Search
CPC ............ F15B 13/0433; F15B 13/0438; F15B 19/002; F15B 2211/634; F15B 2211/6658;
(Continued)

(56) References Cited

U.S. PATENT DOCUMENTS 5,810,046 A * 9/1998 Lee ................. E02F 3/438
                                              137/269
5,819,783 A * 10/1998 Blatt ................. F15B 1/02
                                              137/271
(Continued)

FOREIGN PATENT DOCUMENTS

DE    102009004570    7/2010
DE    102010035263    3/2012
(Continued)

*Primary Examiner* — William M McCalister
(74) *Attorney, Agent, or Firm* — Hoffmann & Baron, LLP

(57) ABSTRACT

A fluid control device including a valve arrangement, the valve arrangement including an air supply valve, and an air outlet valve, and a control means, wherein the control means is electrically connected to the air supply valve and to the air outlet valve, and further includes a sensor input for processing a sensor signal and is connected to a sensor which is configured for determining a functional state of the fluid consumer, wherein the control means is configured for implementing a valve diagnostic process such that a first control signal for the air supply valve and a second control signal for the air outlet valve are each varied between a lower interval limit and an upper interval limit while maintaining a pre-definable sensor signal level of a sensor signal provided by the sensor, and the control means is configured for recording value pairs for the first and second control signals.

10 Claims, 2 Drawing Sheets

(51) Int. Cl.
*F16K 31/00* (2006.01)
*F16K 37/00* (2006.01)
*G05D 7/06* (2006.01)
*F16K 31/126* (2006.01)
*F16K 11/22* (2006.01)

(52) U.S. Cl.
CPC ............ *F16K 11/22* (2013.01); *F16K 31/006* (2013.01); *F16K 31/1262* (2013.01); *F16K 37/0033* (2013.01); *G05D 7/0635* (2013.01); *F15B 2211/634* (2013.01); *F15B 2211/6658* (2013.01); *F15B 2211/85* (2013.01); *F15B 2211/865* (2013.01); *F15B 2211/8636* (2013.01); *F15B 2211/8855* (2013.01)

(58) Field of Classification Search
CPC .......... F15B 2211/85; F15B 2211/8636; F15B 2211/865; F15B 2211/8855; G05D 7/0635; F16K 11/22; F16K 31/006; F16K 31/1262; F16K 37/0033; Y10T 137/2544; Y10T 137/87209; Y10T 137/86614
USPC ............................... 137/102, 596.16, 625.64
See application file for complete search history.

(56) References Cited

U.S. PATENT DOCUMENTS

| | | | | |
|---|---|---|---|---|
| 8,262,060 | B2* | 9/2012 | Heer | G05B 23/0256 137/554 |
| 2001/0007087 | A1* | 7/2001 | Brandt | E02F 3/3414 701/50 |
| 2003/0070710 | A1* | 4/2003 | Inayama | G05D 16/2095 137/85 |
| 2005/0173003 | A1* | 8/2005 | Laverdiere | G05D 16/2013 137/487.5 |
| 2008/0115837 | A1* | 5/2008 | Gray | B64D 13/04 137/102 |
| 2010/0181513 | A1* | 7/2010 | Kresse | F15B 19/002 251/129.04 |
| 2015/0167276 | A1* | 6/2015 | Brinkley | E02F 9/2285 137/596.16 |
| 2015/0211552 | A1* | 7/2015 | Burgett | F15B 13/025 137/625.64 |

FOREIGN PATENT DOCUMENTS

| | | |
|---|---|---|
| DE | 102011116819 | 4/2013 |
| EP | 1717500 | 11/2006 |

* cited by examiner

FLUID CONTROL DEVICE AND METHOD FOR OPERATING A FLUID CONTROL DEVICE

This application claims priority based on an International Application filed under the Patent Cooperation Treaty, PCT/EP2015/075081, filed Oct. 29, 2015.

BACKGROUND OF THE INVENTION

The invention relates to a fluid control device with a valve arrangement comprising an air supply valve for providing a working fluid to a supply port of a fluid consumer, and an air outlet valve for discharging working fluid from the supply port of the fluid consumer, and a control means, wherein the control means is electrically connected to the air supply valve and to the air outlet valve and configured for controlling the air supply valve and the air outlet valve and comprises a sensor input for processing a sensor signal and is connected to a sensor which is configured for determining a functional state of the fluid consumer and for providing a sensor signal to the control means.

EP 1 717 500 A1 discloses a piezo-bender actuator which has a bender actuator element and attached thereto a flexible circuit board with a flexible carrier, with an electrical conductor structure running thereon, wherein a part of the conductor structure of the flexible circuit board, in the region of the working section of the bender actuator element which can be deflected by piezo-electric activation, is configured such that it directly forms at least one sensor. A piezo-bender actuator, which can also be used as an actuator device for a fluid valve, is controlled with a control device which provides an electrical control voltage to the piezo-bender actuator. This control voltage can be provided on the basis of a preceding calibration in which a map is produced, describing a relationship between the control voltage and the deflection of the piezo-bender actuator.

SUMMARY OF THE INVENTION

The object of the invention is to provide a fluid control device and a method for operating a fluid control device which allow calibration in ongoing operation.

This object is achieved for a fluid control device with a valve arrangement comprising an air supply valve for providing a working fluid to a supply port of a fluid consumer, and an air outlet valve for discharging working fluid from the supply port of the fluid consumer, and a control means, wherein the control means is electrically connected to the air supply valve and to the air outlet valve and configured for controlling the air supply valve and the air outlet valve and comprises a sensor input for processing a sensor signal and is connected to a sensor which is configured for determining a functional state of the fluid consumer and for providing a sensor signal to the control means, wherein the control means is configured for implementing a valve diagnostic process, such that a first control signal for the air supply valve and a second control signal for the air outlet valve are each varied between a lower interval limit and an upper interval limit while maintaining a pre-definable sensor signal level of a sensor signal provided by the sensor, and the control means is configured for recording value pairs for the first and second control signals.

Preferably, the control means is equipped with a microprocessor which is provided for executing pre-definable program sequences stored in a memory device. In the execution of such program sequences, the control means is configured to provide individual control signals for the air supply valve and for the air outlet valve, in order to provide a pre-definable working pressure level at a supply port of a fluid consumer which is connected fluidically to both the air supply valve and the air outlet valve, and hence allow an open loop control or a closed loop control for a function of the fluid consumer. Since the open loop control behaviour or the closed loop control behaviour of the fluid control device may change undesirably because of phenomena of ageing and wear of the air supply valve and/or air outlet valve, the control means is configured to perform a valve diagnostic process for the fluid control device at regular or irregular time intervals or after occurrence of a pre-definable operating state, in particular after recommissioning, in order to allow adaptation of the control signals for the air supply valve and the outlet valve depending on their fluidic behaviour.

To this end, the control means makes available to the respective valves, in particular simultaneously, a first control signal for the air supply valve and a second control signal for the air outlet valve. Furthermore, the control means is configured to maintain a pre-definable sensor signal level for a sensor signal provided by the sensor, by suitable influencing of the two control signals within a pre-definable, preferably narrowly limited sensor signal interval. In order to obtain as much knowledge as possible of the fluidic behaviour of the air supply valve and the outlet valve depending on the respective control signals, it is provided that both the first control signal for the air supply valve and the second control signal for the air outlet valve are varied between a lower interval limit and an upper interval limit of a respective control signal interval. By this variation of the control signals for the air supply valve and the outlet valve, different fluidic flows occur between the air supply valve and the air outlet valve, wherein it is provided that a constant fluid pressure is present at the supply port independently of the respective actual fluid flow between the air supply valve and the air outlet valve. By this measure, it can be determined which opening degree of the air supply valve is linked to which opening degree of the air outlet valve if a constant pressure level is to be maintained at the supply port. The pressure level at the supply port is determined directly or indirectly using the sensor. The value pairs determined during this valve diagnostic process, which were determined on the basis of a constant fluid pressure at the supply port, are recorded in the control means, in particular stored in a memory, and can then be retrieved for advantageous control of the air supply valve and/or air outlet valve in order to compensate for ageing and/or wear.

Advantageous refinements of the invention are the subject of the subclaims.

It is suitable if the sensor is configured as a position sensor for detecting a position of a fluid consumer component along a preferably rectilinear movement path. Preferably, the fluid consumer comprises a housing, on or in which a movable fluid consumer component is received. For example, the fluid consumer component is received rotationally movably or translationally movably on the housing, and assumes a position along a movement path depending on a fluid pressure provided at the supply port of the fluid consumer. Particularly preferably, it is provided that a spring means is assigned to the fluid consumer component and, in the absence of a corresponding fluid pressure at the supply port, moves the fluid consumer component into a pre-definable rest position. Thus a conclusion about the fluid pressure present at the supply port can be drawn from the position of the fluid consumer component which is established by means of the sensor.

In an advantageous refinement of the invention, it is provided that the sensor is configured as a pressure sensor assigned to the supply port of the fluid consumer. By means of the sensor, the fluid pressure at the supply port can thus be determined directly.

In a further embodiment of the invention, it is provided that the fluid control device comprises a fluid consumer which is configured as a pilot controlled fluid valve and has a supply port connected to the air supply valve and to the air outlet valve. Thus the air supply valve and the air outlet valve serve as pilot control valves for fluidic influencing of a valve position of the fluid consumer. Preferably, the fluid pressure at the supply port acts on an actuator piston received in a valve housing and connected by means of a coupling rod to a valve body, which in turn is provided for influencing a free cross-section of a fluid channel formed in a valve housing. Depending on the position of the actuator piston along the preferably rectilinear movement path, the valve body opens a fraction of the free cross-section of the fluid channel, or the entire fluid channel, or blocks this completely. It is particularly advantageous if a flexible membrane is arranged between the supply port and the actuator piston, which membrane is provided to separate the working fluid, made available at the supply port by the air supply valve, from a fluid flowing through the fluid channel.

Preferably, it is provided that the fluid consumer comprises a valve member received movably in a valve housing, for influencing a free cross-section of a fluid channel formed in the valve housing, which channel has a valve seat for tight contact of an elastic sealing means formed on the valve member, and the control means is configured for performing a valve diagnostic process such that the tight contact of the elastic sealing means formed on the valve member is retained during performance of the valve diagnostic process. With such an embodiment of the control means, it is advantageous that the valve diagnostic process can be carried out without perceptibly influencing the behaviour of the fluid consumer configured as a fluid valve. Rather, on performance of the process, the elasticity properties of the sealing means are utilised in that the valve member is brought, by suitable pressurisation of the supply port, from the rest position into the diagnostic position in which both a slight rise and a slight fall in fluid pressure lead to a measurable position change for the valve member without jeopardising the tight contact of the sealing means on the valve seat.

It is advantageous if the air supply valve and the air outlet valve each have a piezo actuator formed as an actuator for a valve body. The piezo actuator is preferably formed as a piezo bender which, depending on an electrical control voltage, assumes an adjustable curvature and acts with a freely movable end region on a valve body in order to move this between a release position and a blocking position relative to the valve seat. Such an air supply valve or air outlet valve is distinguished by a compact structure and high switching speed, but is subject to certain ageing and wear phenomena which may be compensated, at least for a certain period, by the control means.

The object of the invention is also achieved by a method for operating a fluid control device. This method comprises the steps: provision of a first variable control signal to an air supply valve for a supply of a working fluid stream to a supply port of a fluid consumer, and provision of a second variable control signal to an air outlet valve for a discharge of a working fluid stream from the supply port of the fluid consumer, wherein the first and the second control signals form a value pair, and the value pair is stored if a functional position of the fluid consumer, detected by means of a sensor signal from a sensor assigned to the fluid consumer, lies within a pre-definable position interval, wherein the two control signals are each varied between a lower interval limit and an upper interval limit. In performance of the method therefore, it is provided that both the air supply valve and the air outlet valve are controlled by provision of the first and second control signals, such that a working pressure provided at the supply port of the fluid consumer leads to a pre-definable function position of the fluid consumer. Preferably, both the air supply valve and the air outlet valve are proportional valves, so that both an inflow of working fluid to the supply port and an outflow of working fluid from the supply port can be set freely within certain limits, and the working pressure at the supply port results from the balance between the inflowing and outflowing working fluid. A pre-definable working pressure can be set with a plurality of different positions of the air supply valve and a corresponding plurality of different positions of the air outlet valve, wherein every possible position of the two valves which leads to the desired working pressure is stored as a value pair.

In a further embodiment of the method, it is provided that for performance of the valve diagnostic process, the fluid consumer is brought from a rest position to a diagnostic position by the setting of a fluidic equilibrium between the supply and the discharge of working fluid at the assigned supply port, and that the variable control signals for the air supply valve and the air outlet valve are closed loop controlled within the respective interval limits depending on the sensor signal. Preferably, the diagnostic position is selected such that the fluid consumer can be operated by closed loop control, so that both an increase and a reduction in the working pressure at the supply port lead to a measurable change of the sensor signal measured by the sensor, and hence the desired plurality of value pairs for the control signals of the air supply valve and air outlet valve can be stored.

In a further embodiment of the method, it is provided that the fluid consumer is configured as a pilot controlled fluid valve with a valve member, a valve seat and an elastic sealing means, wherein the valve member is brought, by the working fluid provided during performance of the valve diagnostic process, from the rest position in which the valve member still lies tightly on the valve seat and in which a high surface pressure exists between the sealing means and the valve seat, into the diagnostic position in which a moderate surface pressure exists between the sealing means and the valve seat and in which the valve member still lies tightly on the valve seat, and that the sensor signal is a position signal which depends on a position of the valve member relative to the valve seat.

In a further embodiment of the method, it is provided that a calibration function is calculated from the value pairs and used for operation of the fluid control device. Preferably, the value pairs are used to determine a control curve for the air supply valve and/or for the air outlet valve, by means of which a control behaviour for at least one of the two valves can be influenced during regular operation of the fluid control device. With the valve diagnostic process, for example ageing and wear phenomena of the air supply valve and/or air outlet valve can be at least partially compensated.

BRIEF DESCRIPTION OF THE DRAWINGS

An advantageous embodiment of the invention is depicted in the drawing. They show.

DETAILED DESCRIPTION OF THE PREFERRED EMBODIMENTS

Figure 1:
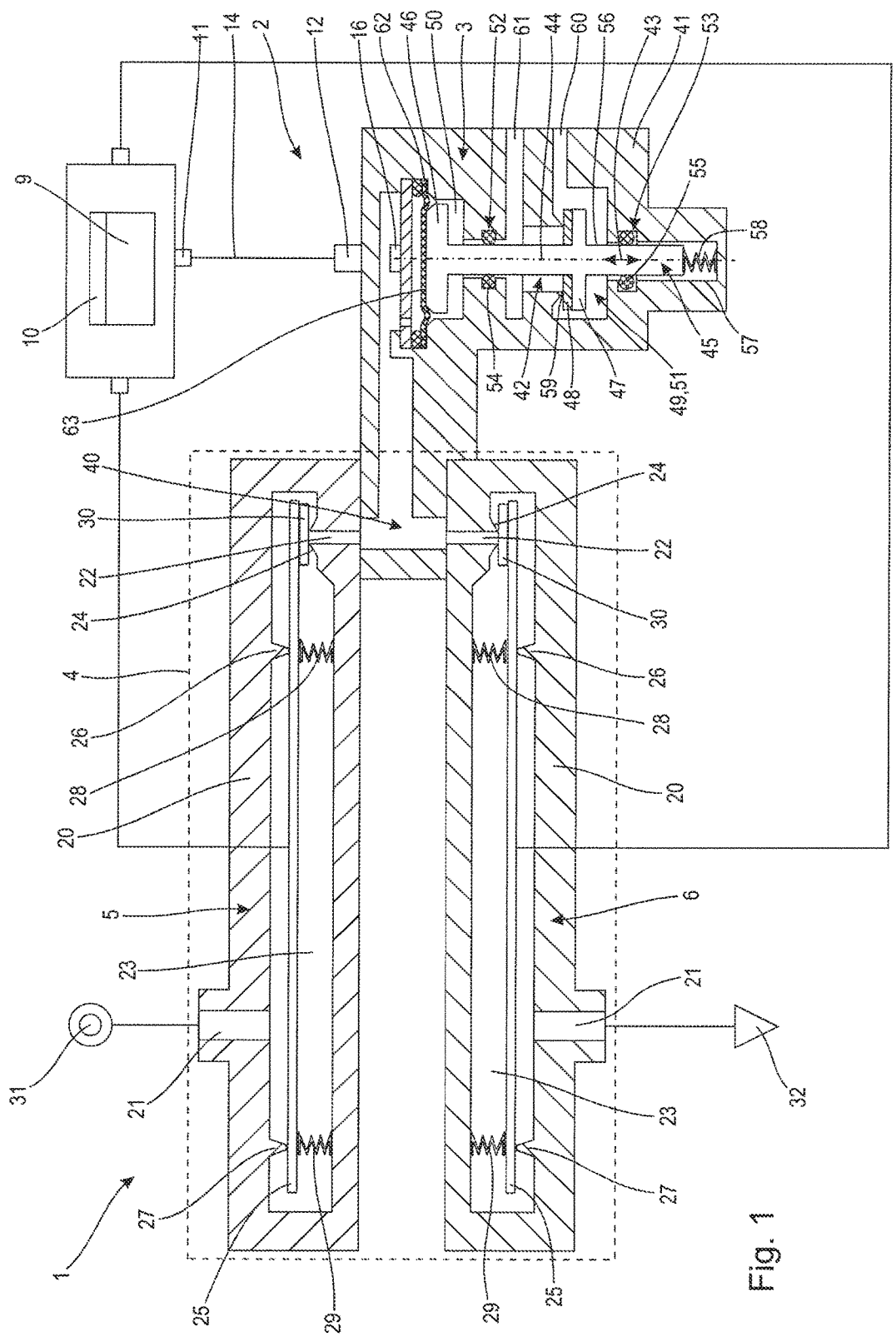
FIG. 1 a highly diagrammatic, sectional depiction of the fluid control device with an air supply valve and an air outlet valve, and a fluid consumer configured as a pilot controlled fluid valve, and FIG. 2 a diagrammatic illustration to depict the value pairs determined during the valve diagnostic process.

A fluid control device 1 shown in FIG. 1 is provided for fluidic control of a fluid consumer 2, which purely as an example is a fluidically pilot controlled fluid valve 3.

The fluid control device 1 comprises a valve arrangement 4 with an air supply valve 5 for providing a working fluid from a fluid source 31 to a supply port 40 of the fluid consumer 2, and with an air outlet valve 6 for discharging working fluid from the supply port 40 of the fluid consumer 2. Purely as an example, both the air supply valve 5 and the air outlet valve 6 are configured as piezo valves, as described in more detail below.

The fluid control device 1 comprises a control means 9, depicted purely diagrammatically, which comprises for example a microprocessor and an assigned memory device 10, wherein the microprocessor is configured for processing a program stored in the memory device 10 using values also stored in the memory device 10. The memory device 10 is furthermore configured to store value pairs of control signals, as will be described in more detail below.

The control means 9 is electrically connected to the air supply valve 5 and the air outlet valve 6, and provides respective control signals for controlling the air supply valve 5 and the air outlet valve 6. Furthermore, a sensor input 11 is assigned to the control means 9, which is provided for electrical connection of a sensor lead 14 of a sensor 12. The sensor 12, which is configured for determining a function position of a valve member 41 of the fluid valve 3, is for example a Hall effect sensor which is configured to detect a flux density of a permanent magnet 16 arranged on the valve member 41. On a change in distance between the sensor 12 and the permanent magnet 16 resulting from a movement of the valve member 41, the flux density which can be detected by the sensor 12 changes, whereby a change occurs in the sensor signal which is generated by the sensor 12 from the flux density determined, and which is provided via the sensor line to the control means 9.

As an example, it is provided that the air supply valve 5 and the air outlet valve 6 are configured identically, so that the description below of the structure and function of the air supply valve 5 also applies accordingly to the air outlet valve 6. The air supply valve 5 comprises a valve housing 20, formed for example as a box, with an inlet port 21, an outlet port 22, a fluid channel 23 extending between the inlet port 21 and the outlet port 22, and a valve seat 24 in the fluid channel 23 and formed for example in the region of the outlet port 22. As an example, in a cross-sectional plane oriented perpendicularly to the drawing plane of FIG. 1 and not shown, the fluid channel 23 has a rectangular cross-section and serves to receive a piezo bender 25, which constitutes the actuator for the air supply valve 5. The piezo bender 25 is itself formed as a platform and extends beyond the inlet port 21 and the outlet port 22. At an end region facing the valve seat 24, the piezo bender 25 is provided with a sealing element 30, which for example may be made of a rubber-elastic material and is configured for a sporadic tight contact on the valve seat 24. Purely as an example, both the air supply valve 5 and the air outlet valve 6 are formed as normally closed valves in which, in the absence of a sufficiently high control voltage for the respective piezo bender 25, a tight contact of the sealing element 20 on the respective valve seat 24 is provided. Furthermore, the piezo bender 25 is pressed against blade-like supports 26, 27 by means of springs 28, 29. In the presence of a sufficiently high control voltage at the piezo bender 25, a curvature of the piezo bender 25 occurs, running in the drawing plane of FIG. 1, such that the sealing element 30 is raised from the valve seat 24 and hence a fluidic connection between the inlet port 21 and the outlet port 22 is opened. Depending on the control voltage for the piezo bender 25, a lesser or greater curvature of the piezo bender 25 occurs, so that a distance between the valve seat 24 and the sealing element 30 may be smaller or larger, and hence a smaller or larger cross-section of the fluid channel 23 is made available for a fluid flow. Preferably, it is provided that the piezo bender 25 can be brought into a plurality of different curvature positions by a control signal of the control means 9, so that the air supply valve 5 and similarly the air outlet valve 6 have a plurality of opening positions and can be operated in the manner of proportional valves.

As an example, it is provided that the inlet port 21 of the air supply valve 5 is connected to a fluid source 31, while the inlet port 21 of the air outlet valve 6 is fluidically coupled to a fluid sink 32, which for example may be formed as a silencer. Furthermore, the outlet port 22 of the air supply valve 5 and the outlet port 22 of the air outlet valve 6 are connected to a supply port 40 of the fluid valve 3 serving as a fluid consumer.

The fluid valve 3 comprises a valve member 42, which is received in a valve housing 41 so as to be linearly movable for example along a movement path 43, and which is formed for example rotationally symmetrically to a longitudinal axis 44 oriented parallel to the movement path 43. As an example, the valve member 42 comprises a rod-like base body 49, on the end of which a plate-like working piston 46 is formed. Furthermore, a circularly peripheral, annular collar 47 is provided on the base body 45 and carries an annular sealing disc serving as a sealing means 48. To allow a movable arrangement of the valve member 42 in the valve housing 41, it is provided that the valve housing 41 has a valve recess 49 which comprises an actuating portion 50 to receive the working piston 46 and a working section 51 to receive the collar 47 with the sealing means 48. Purely as an example, it is provided that, between the actuating portion 50 and the working section 51 and at an end region facing away from the working piston 46, the valve recess 49 has guide portions 52, 53 respectively, which on an inner surface each carry a sealing ring 54, 55 lying tightly on a circular cylindrical outer surface 56 of the base body 45, hence guaranteeing a fluidic separation between the actuating portion 50 and the working section 51 and between the working section 51 and the spring portion 57. The spring portion 57 is formed for example as a circular cylindrical blind hole in which a return spring 58 is received, which is configured to exert a return force on the valve member 42. Using the return spring 58, the sealing means 48 of the valve member 42 is pressed against a valve seat 59 which is provided in the valve housing 41 and is for example formed as a conical ring. The fluid valve 3, purely as an example, is thus a normally closed valve, wherein in the closed position or rest position shown in FIG. 1, a fluidically communicating connection between an inlet port 60 and an outlet port 61 of the valve recess 49 is interrupted. If, however, the actuating portion 50 is pressurised, which can be achieved by provision of a pressurised working fluid at the supply port 40, this fluid pressure acts on a flexible sealing membrane 62, which along its edge is fixed tightly in the valve housing 41, and hence on a working face 63 of the working piston 46 facing away from the return spring 58. This force effect can deform the return spring 58 elastically, whereby the valve member 42 can move along the movement path 43, whereby the sealing means 48 can be raised from the valve seat 59 and hence the fluidically communicating connection between the inlet port 60 and the outlet port 61 of the valve recess 49 is opened.

In the rest position, the elastic sealing means 49 is compressed depending on the return force of the return spring 58, so that the desired tight contact of the sealing means 49 on the valve seat 59 is guaranteed.

To perform the valve diagnostic process, a slight force is applied to the valve member 42, which can be achieved by providing a low working pressure at the supply port 40. This causes a slight displacement of the valve member 42 along the movement path 43 from the rest position shown in FIG. 1 to a diagnostic position, wherein this displacement is selected such that, because of the elastic return deformation of the sealing means 48, there is no opening of the fluidically communicating connection between the inlet port 60 and the outlet port 61 of the valve recess 49. The low working pressure at the supply port 40 can be provided by various opening positions of the air supply valve 5 and air outlet valve 6. For example, it is provided that to perform the valve diagnostic process, the control means 9 performs a positional closed loop control for the valve member 42 based on the signal from the sensor 12, wherein the valve member 42 is held in the diagnostic position and wherein the opening positions for the air supply valve 5 and air outlet valve 6 are varied within as wide an interval as possible. For each opening position of the air supply valve 5, a corresponding opening position of the air outlet valve 6 is sought, and the respective control signals necessary to achieve the respective opening positions are stored in the memory device 10 as a value pair.

Figure 2:
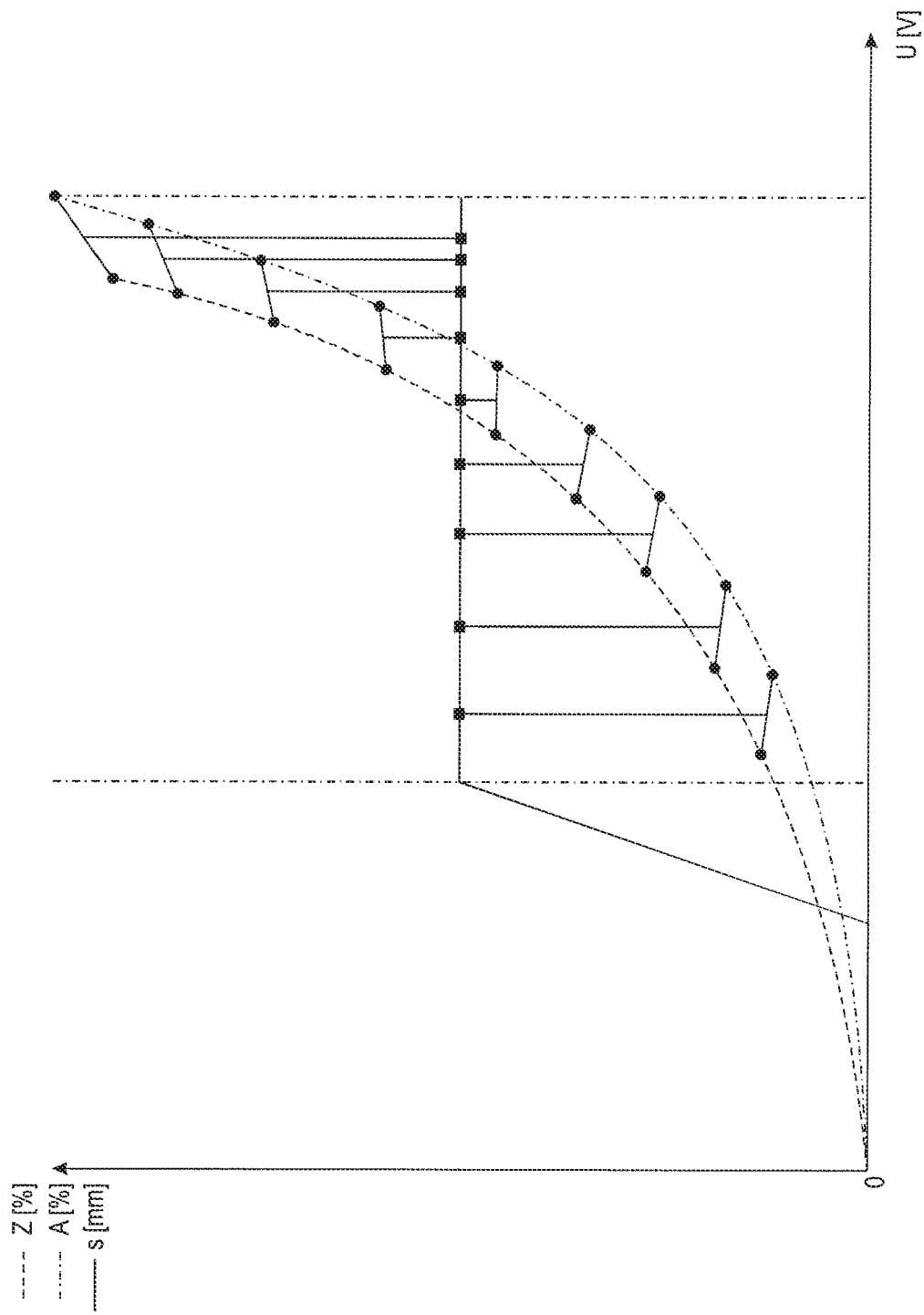

From the stored value pairs 69 to 77 for a control signal level 66 for the air supply valve 5 and for a control signal level 67 for the air outlet valve 6, depicted purely diagrammatically in FIG. 2, by suitable calculations the control means 9 can determine a compensation value for controlling the air supply valve 5 and the outlet valve 6, with which then the respective valve 5, 6 can be controlled during normal operation of the fluid valve 3. This compensation value serves to compensate at least partially for ageing and wear phenomena at the air supply valve 5 and air outlet valve 6, so that operation of the fluid valve 3 can be guaranteed over a longer period without restrictions in relation to valve function.

In the view shown in FIG. 2, three different curves 66, 67, 68 are depicted. Curves 66 and 67 each depict a correlation between a voltage level U[V], shown on the abscissa axis (horizontal axis), for the control signals with which the two piezo benders 25 of the air supply valve 5 and air outlet valve 6 are loaded, and a percentage opening for the air supply valve 5—Z [%] and/or for the air outlet valve 6—A [%] on the ordinate (vertical axis). The curve 68 shows the movement of the valve member 42 relative to the valve housing 41, wherein because of the closed loop control of the two valves 5, 6, the curve 68 is formed as a straight line over a large distance. Each of the value pairs 69 to 77 comprises a percentage opening value for the air supply valve 5 and a percentage opening value for the air outlet valve 6, and a position of the valve member 42 resulting from these opening values. Whereas initially there is no movement of the valve member 42 at low control signal levels 66, 67 and the resulting low percentage opening values, at certain control signal levels 66, 67, a movement of the valve member 41 begins which, as the control signal levels 66, 67 rise, leads to reaching of the diagnostic position 78. From this time, during performance of the valve diagnostic process, the control means 9 regulates the control signal level 66, 67 such that the diagnostic position 78 is retained and a further increase occurs in the control signal level 66, 67 until a further value pair 69 to 77 is found. The value pairs 69 to 77 shown in FIG. 2 are purely exemplary; a plurality of further value pairs may lie between the individual value pairs 69 to 77.

After reaching the maximum opening value for at least one of the two valves 5, 6, the valve diagnosis is ended and the control means 9 now calculates compensation values for controlling the valves 5, 6 in normal operation, wherein the compensation values are calculated from the value pairs 69 to 77 and any further value pairs.

The invention claimed is:

1. A fluid control device includes a valve arrangement, the valve arrangement comprising an air supply valve for providing a working fluid to a supply port of a fluid consumer, and an air outlet valve for discharging working fluid from the supply port of the fluid consumer, and further comprising a control means, wherein the control means is electrically connected to the air supply valve and to the air outlet valve and is configured for controlling the air supply valve and the air outlet valve, and the control means further comprises a sensor input for processing a sensor signal and is connected to a sensor which is configured for determining a functional state of the fluid consumer and for providing a sensor signal to the control means, wherein the control means is configured for implementing a valve diagnostic process such that a first control signal for the air supply valve and a second control signal for the air outlet valve are each varied between a lower interval limit and an upper interval limit while maintaining a pre-definable sensor signal level of a sensor signal provided by the sensor, and the control means is configured for recording value pairs for the first and second control signals.

2. The fluid control device according to claim 1, wherein the sensor is configured as a position sensor for detecting a position of a fluid consumer component along a movement path.

3. The fluid control device according to claim 1, wherein the sensor is configured as a pressure sensor assigned to the supply port of the fluid consumer.

4. The fluid control device according to claim 1, further comprising a fluid consumer which is configured as a pilot controlled fluid valve and has a supply port connected to the air supply valve and to the air outlet valve.

5. The fluid control device according to claim 4, wherein the fluid consumer comprises a valve member received movably in a valve housing for influencing a free cross-section of a fluid channel formed in the valve housing, which fluid channel has a valve seat for tight contact of an elastic sealing means formed on the valve member, and wherein in that the control means is configured for performing a valve diagnostic process such that the tight contact of the elastic sealing means formed on the valve member is retained during performance of the valve diagnostic process.

6. The fluid control device according to claim 1, wherein the air supply valve and the air outlet valve each have a piezo-actuator formed as an actuator for a valve body.

7. A method for operating a fluid control device with the steps:

provision of a first variable control signal to an air supply valve for a supply of a working fluid stream to a supply port of a fluid consumer; and provision of a second variable control signal to an air outlet valve for a discharge of a working fluid stream from the supply port of the fluid consumer, wherein the first and the second control signals form a value pair, and the value pair is stored if a functional position of the fluid consumer, detected by means of a sensor signal from a sensor assigned to the fluid consumer, lies within a pre-definable position interval, wherein the two control signals are each varied between a lower interval limit and an upper interval limit.

8. The method according to claim 7, wherein, for performance of the valve diagnostic process, the fluid consumer is brought from a rest position to a diagnostic position by the setting of a fluidic equilibrium between the supply and discharge of working fluid to the assigned supply port, and wherein the variable control signals for the air supply valve and the air outlet valve are closed loop controlled within the respective interval limits depending on the sensor signal.

9. The method according to claim 8, wherein the fluid consumer is configured as a pilot controlled fluid valve with a valve member, a valve seat and an elastic sealing means, wherein the valve member is brought, by the working fluid provided during performance of the valve diagnostic process, from the rest position in which the valve member still lies tightly on the valve seat and in which a high surface pressure exists between the sealing means and the valve seat, into the diagnostic position in which a moderate surface pressure exists between the sealing means and the valve seat and in which the valve member still lies tightly on the valve seat, and wherein that the sensor signal is a position signal which depends on a position of the valve member relative to the valve seat.

10. The method according to claim 7, wherein a calibration function is calculated from the value pairs and used for operation of the fluid control device.

* * * * *